United States Patent
Satoh

(10) Patent No.: US 6,640,633 B2
(45) Date of Patent: Nov. 4, 2003

(54) ULTRASONIC IMAGING METHOD AND ULTRASONIC IMAGING APPARATUS

(75) Inventor: Tomoo Satoh, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 53 days.

(21) Appl. No.: 10/082,095

(22) Filed: Feb. 26, 2002

(65) Prior Publication Data

US 2002/0117004 A1 Aug. 29, 2002

(30) Foreign Application Priority Data

Feb. 28, 2001 (JP) ........................................ 2001-053347

(51) Int. Cl.[7] .............................. A61B 8/00; G01N 29/06
(52) U.S. Cl. .............................. 73/626; 73/628; 73/633; 600/443; 600/447
(58) Field of Search ........................ 73/618, 620, 624, 73/625, 626, 628, 633; 600/443, 447

(56) References Cited

U.S. PATENT DOCUMENTS

| | | | | |
|---|---|---|---|---|
| 4,722,345 A | * | 2/1988 | Ueno et al. ................... | 600/445 |
| 5,072,735 A | * | 12/1991 | Okazaki et al. .............. | 600/443 |
| 5,111,824 A | * | 5/1992 | Lazenby et al. ............. | 600/447 |
| 5,462,057 A | * | 10/1995 | Hunt et al. ................... | 600/447 |
| 5,471,989 A | * | 12/1995 | Roundhill et al. ........... | 600/440 |
| 5,782,768 A | * | 7/1998 | Hashimoto et al. .......... | 600/443 |
| 6,089,096 A | * | 7/2000 | Alexandru .................... | 73/626 |
| 2001/0014773 A1 | * | 8/2001 | Jago ............................ | 600/437 |

FOREIGN PATENT DOCUMENTS

WO    WO 99/05969    * 2/1999     ............. A61B/8/00

* cited by examiner

Primary Examiner—Hezron Williams
Assistant Examiner—Rose M. Miller
(74) Attorney, Agent, or Firm—Sughrue Mion, PLLC

(57) ABSTRACT

An ultrasonic imaging method capable of increasing density of sampling points in accordance with depths within an object. In this method, a predetermined area contained in the object is divided into at least a first area located most shallowly and a second area located deeper. The method includes the steps of: (a) transmitting and receiving ultrasonic waves focused in one focus direction within the first area to take samples of an ultrasonic image at a plurality of points in the focus direction, and changing the focus direction to scan the first area; (b) sequentially transmitting ultrasonic waves focused in respective focus directions within the second area in a predetermined time period, thereafter receiving ultrasonic waves reflected from the respective focus directions to take samples of the ultrasonic image at a plurality of points in the respective focus directions.

20 Claims, 8 Drawing Sheets

PULSE RECIPROCATION TIME

ULTRASONIC IMAGING METHOD AND ULTRASONIC IMAGING APPARATUS

BACKGROUND OF THE INVENTION

1. Field of the Invention

The present invention generally relates to an ultrasonic imaging method and an ultrasonic imaging apparatus, capable of performing nondestructive tests by employing ultrasonic waves. More specifically, the present invention is directed to such ultrasonic imaging method and apparatus, capable of scanning a radial-shaped area contained in an object to be inspected (sector scanning) by employing ultrasonic waves so as to obtain an image information of this radial-shaped area.

2. Description of a Related Art

Normally, in ultrasonic imaging apparatuses utilized as ultrasonic diagnostic apparatuses or industrial-purpose flaw detecting apparatuses, ultrasonic probes are employed each contains a plurality of ultrasonic transducers and has ultrasonic transmission/reception functions. In one typical ultrasonic imaging apparatus equipped with such an ultrasonic probe, image information related to an object to be inspected may be obtained in such a manner that this object to be inspected is ultrasonically scanned by using ultrasonic beams, while the ultrasonic beams are produced by synthesizing ultrasonic waves transmitted from the plurality of ultrasonic transducers. Then, the ultrasonic imaging apparatus may reproduce images of either two-dimensional areas or three-dimensional areas contained in the object to be inspected based upon the obtained image information. As one of scanning methods for scanning an object to be inspected by way of such ultrasonic beams, a so-called "sector scanning operation" is carried out by which a two-dimensional fan-shaped region is ultrasonically scanned along angular directions.

FIGS. 7A to 7C are explanatory diagrams for illustratively explaining one typical example of the conventional sector scanning operation.

As shown in FIG. 7A, since ultrasonic waves transmitted to an object to be inspected from a plurality of ultrasonic transducers contained in an ultrasonic probe are synthesized with each other, an ultrasonic beam 101 is formed in the object to be inspected, while this ultrasonic beam 101 is extended from a transmission point 100 in a depth direction. Then, a fan-shaped two-dimensional area 103 which is contained in the object to be inspected is sequentially scanned by this ultrasonic beam 101 "N" times in a direction of an angle "θ" in an equi-interval. It should be noted that symbol "N" is a natural number.

Furthermore, as illustrated in FIG. 7B, at a plurality of sampling points 102, image information is sequentially sampled, while these plural sampling points 102 are distributed in an equi-interval in the depth direction along the ultrasonic beam 101 at the respective angles. As previously described, while the scanning operation by using one ultrasonic beam is carried out, image information related to a plurality of sampling points located on this single ultrasonic beam is sampled every time a predetermined time period has passed.

FIG. 7C shows a time chart for explaining such a scanning process operation of the ultrasonic beam. As shown in FIG. 7C, in order to perform a scanning operation of a single ultrasonic beam, a constant repetition time PRT (namely, pulse repetition time period) is consumed. Furthermore, a total value of pulse repetition time period PRT which is consumed to execute scanning operations of a plurality of ultrasonic beams-constitutes imaging time required for scanning an entire portion of a two-dimensional area. With respect to one pulse repetition time period PRT, a plurality of ultrasonic waves are transmitted to an object to be inspected so as to form one ultrasonic beam within a pulse transmission time slot TP. Then, at time instants indicated by white-colored points (see FIG. 7C), ultrasonic echoes are received which are reflected from a plurality of sampling points distributed along one ultrasonic beam, and then, image information related to the respective sampling points is sampled based upon these received ultrasonic echoes.

However, when such a sampling operation of the image information as shown in FIG. 7B is carried out, a total number of ultrasonic beams 101 (namely, density of ultrasonic beams) employed in a scanning operation of a unit area with respect to a deeper portion 105 within a two-dimensional area 103 becomes smaller than that of a shallower portion 104 thereof. As a result, an image quality of image information related to the deeper portion 105 becomes coarser than that related to the shallower portion 104.

As a consequence, as shown in FIG. 8A, the following solution method is conceivable. That is, since a total time of scanning operations for the deeper portion 105 is made larger than that of the shallower portion 104, density of sampling points 102 within the deeper portion 105 can be increased substantially equal to density of the sampling points 102 within the shallower portion 104. In FIG. 8A, black-colored points indicate such sampling points which are newly added. In this case, as shown in FIG. 8A, a scanning operation only directed to the deeper portion 105 is carried out between a first scanning operation and a second scanning operation of the conventional sector scanning operations, and then, such a scanning process operation is repeatedly carried out. FIG. 8B is a time chart for explaining such a scanning process operation of the ultrasonic beam. In this time chart, black-colored points represent time instants when ultrasonic echoes reflected from the newly added sampling points are received.

However, even in such a scanning operation directed only to the deeper portion, a time duration is required for ultrasonic waves transmitted from an ultrasonic probe to reach these sampling points and return to the ultrasonic probe. As a result, even when the scanning operation directed only to the deeper portion is carried out, such a time duration substantially equal to the time duration required for a single scanning operation in the conventional sector scanning operation would be consumed. As a consequence, a total scanning number of the sector scanning operation as shown in FIG. 8A is equal to substantially two times as large as a total scanning number of the sector scanning operation as shown in FIG. 7B. Thus, a frame rate of this sector scanning operation as shown in FIG. 8A, which corresponds to an inverse number of imaging time, would be lowered to a substantially half of a frame rate in the sector scanning operation as shown in FIG. 7B.

SUMMARY OF THE INVENTION

The present invention has been made to solve the above-described problems, and therefore, has an object to provide an ultrasonic imaging method and an ultrasonic imaging apparatus, capable of increasing density of sampling points in accordance with a depth degree within an object to be inspected, while a frame rate is not necessarily decreased.

To achieve the above-described object, an ultrasonic imaging method according to one aspect of the present invention, of obtaining image information in such a manner that a predetermined area contained in an object to be inspected is divided into at least a first area located most shallowly and a second area located deeper than the first area so as to scan the first and second areas by employing ultrasonic waves, comprises the steps of: (a) transmitting and receiving ultrasonic waves focused in one focus direction within the first area by using a plurality of ultrasonic transducers included in an ultrasonic probe to take samples of an ultrasonic image at a plurality of points in the focus direction, and changing the focus direction to scan the first area; (b) sequentially transmitting ultrasonic waves focused in respective focus directions within the second area by using the plurality of ultrasonic transducers in a predetermined time period, thereafter receiving ultrasonic waves reflected from the respective focus directions by using the plurality of ultrasonic transducers to take samples of the ultrasonic image at a plurality of points in the respective focus directions; (c) obtaining image information as to the plural points within the first area on the basis of detection signals obtained from the plurality of ultrasonic transducers at step (a); and (d) obtaining image information as to the plural points within the second area on the basis of detection signals obtained from the plurality of ultrasonic transducers at step (b).

Also, an ultrasonic imaging apparatus according to one aspect of the present invention, for obtaining image information in such a manner that a predetermined area contained in an object to be inspected is divided into at least a first area located most shallowly and a second area located deeper than the first area so as to scan the first and second areas by employing ultrasonic waves, comprises: drive signal generating means for delaying input signals to supply drive signals having specific phases, respectively; an ultrasonic probe having a plurality of ultrasonic transducers, for transmitting ultrasonic waves in accordance with the drive signals and for receiving ultrasonic waves to output detection signals based upon the received ultrasonic waves; signal processing means for processing the detection signals to obtain image information of an object to be inspected on the basis of the processed detection signals; and control means for controlling the drive signal generating means and the signal processing means to (a) transmit and receive ultrasonic waves focused in one focus direction within the first area by using the plurality of ultrasonic transducers to take samples of an ultrasonic image at a plurality of points in the focus direction, and change the focus direction to scan the first area and (b) sequentially transmit ultrasonic waves focused in respective focus directions within the second area by using the plurality of ultrasonic transducers in a predetermined time period, thereafter receive ultrasonic waves reflected from the respective focus directions by using the plurality of ultrasonic transducers to take samples of the ultrasonic image at a plurality of points in the respective focus directions.

According to the present invention, a radial-shaped area contained in the object to be inspected is divided into a plurality of areas having different depth degrees, and these plural areas are independently scanned. In particular, as to an area having a deep depth degree within the radial-shaped area, a plurality of ultrasonic waves are transmitted to the object to be inspected so as to sequentially form a plurality of ultrasonic beams extended in the different directions within a time period in which ultrasonic echoes reflected from an area located more shallowly than the deep area are obtained. As a consequence, density of ultrasonic beams in the deep area within the radial-shaped area can be increased, while the scanning time is not much increased. Accordingly, the density of the sampling points can be increased in accordance with the depth degrees of the object to be inspected, while the frame rate is not unnecessarily decreased.

BRIEF DESCRIPTION OF THE DRAWINGS

A more better understanding of the present invention may be made by reading a detailed description in conjunction with the accompanying drawings, in which.

DESCRIPTION OF THE PREFERRED EMBODIMENTS

Figure 1:
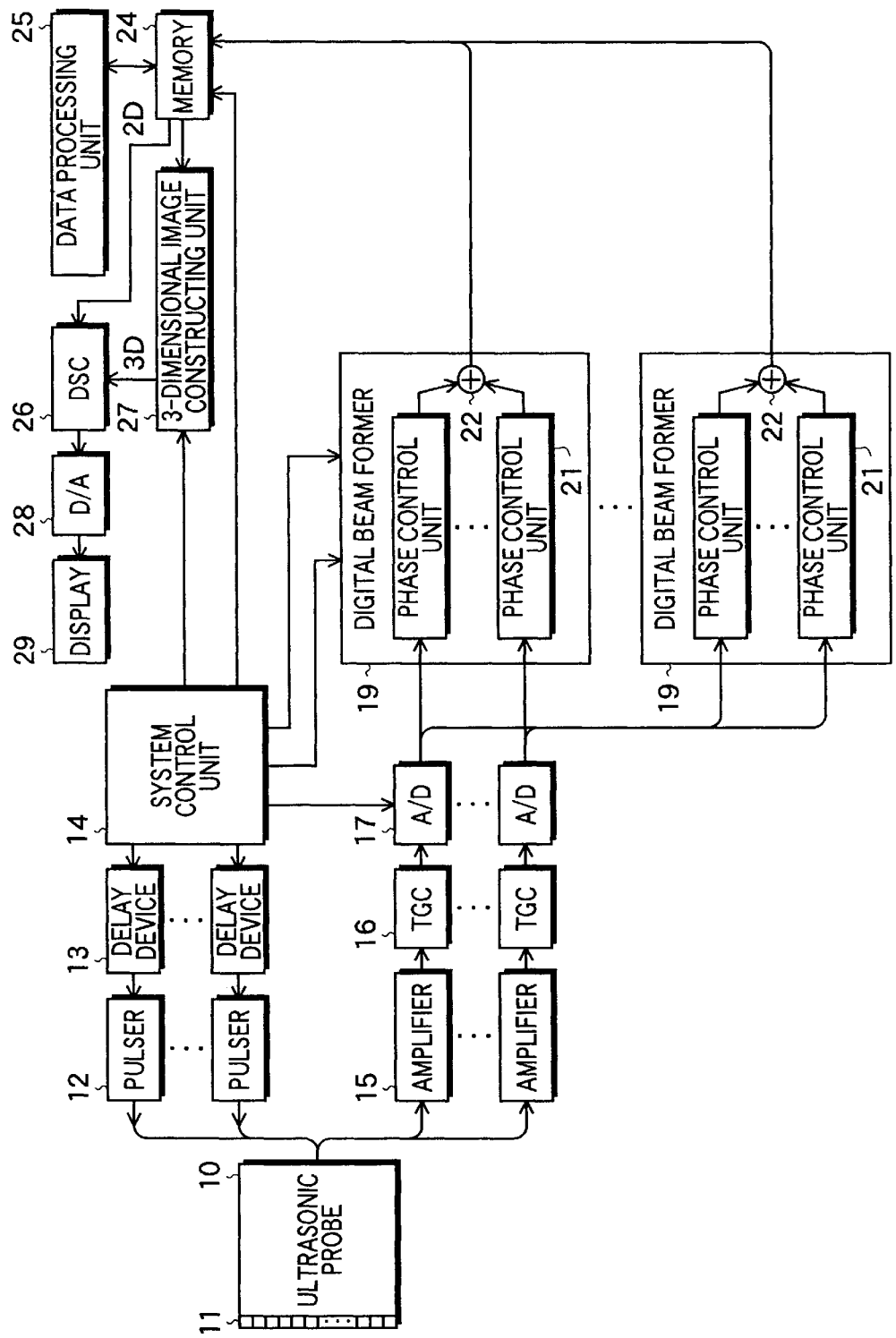
FIG. 1 is a schematic block diagram showing a main arrangement of an ultrasonic imaging apparatus according to a first embodiment of the present invention.

Referring now to drawings, various preferred embodiments of the present invention will be described in detail. It should be understood that the same reference numerals will be employed as those for indicating the same, or similar structural elements, and therefore, descriptions thereof are omitted.

FIG. 1 is a system diagram showing a main arrangement of an ultrasonic imaging apparatus according to a first embodiment of the present invention. This ultrasonic imaging apparatus may be employed as, for example, an ultrasonic diagnostic apparatus to be used for diagnosing a human body etc. or a flaw detecting apparatus to be used in an industrial field.

As shown in FIG. 1, this ultrasonic imaging apparatus includes an ultrasonic probe 10 which is used by abutting against an object to be inspected. The ultrasonic probe 10 includes a plurality of ultrasonic transducers 11 having a transmission/reception function of ultrasonic waves. As the ultrasonic transducer 11, for example, piezoelectric elements are employed which involve piezoelectric ceramics typically known as PZT (Pb(lead) zirconate titanate) or a polymer piezoelectric element typically known as PVDF (polyvinyl difluoride).

The plurality of ultrasonic transducers 11 transmit ultrasonic pulses to the object to be inspected in accordance with drive signals which are input from a plurality of pulse generating circuits (pulsers) 12 corresponding to these plural ultrasonic transducers 11, respectively. Then, these ultrasonic transducers 11 receive ultrasonic pulses reflected from the object to be inspected so as to output detection signals.

The plurality of pulsers 12 are energized in response to output signals of a plurality of digital delay devices 13 corresponding to these pulsers 12, respectively, and then output the drive signals. As a pulser 12, a high-speed pulser which can output a drive signal in a high repetition cycle may be preferably employed. As will be explained later, it is necessary to successively produce ultrasonic beams extended in different directions within a short time period by synthesizing a plurality of ultrasonic pulses with each other in accordance with a portion of the object to be scanned.

A system control unit 14 for controlling an entire system of this ultrasonic imaging apparatus controls delay time as to the plurality of digital delay devices 13. Under control of this system control unit 14, a plurality of ultrasonic pulses having phase differences corresponding to time differences of those drive signals are transmitted from the plurality of ultrasonic transducers 11 to the object to be inspected, and also an ultrasonic beam which is formed by synthesizing these ultrasonic pulses to each other is deflected in a desirable direction.

On the other hand, the detection signals output from the plural ultrasonic transducers 11 are processed in the analog processing manner by a plurality of pre-amplifiers 15 and a plurality of TGC (time gain compensation) amplifiers 16, which correspond to these plural ultrasonic transducers 11. By this analog processing operation, signal levels of those detection signals are matched to input signal levels of a plurality of A/D converters 17. The analog signals output from the plural TGC amplifiers 16 are converted into digital signals (namely, detection data) by the plural A/D converters 17 under control of the system control unit 14.

The detection data output from a plurality of A/D converters 17 are entered into a plurality of digital beam formers 19 in a parallel mode. A plurality of phase control units 21 corresponding to a plurality of ultrasonic transducers 11 are provided in the respective digital beam formers 19. Each of these phase control units 21 may apply a desirable delay to the corresponding detection data by employing a shift register delay line, a digital very small-sized delay line, or a combination of a CPU and software, otherwise a combination of these delay means. The digital data output from the phase control units 21 are digitally added to each other in a digital adder 22, so that phase matching operations of the plural detection data obtained by using a series of ultrasonic transducers 11 contained in the ultrasonic probe 10 are carried out. As explained above, since a plurality of digital beam formers 19 are employed, reception focusing operations related to plural directions within the object to be inspected can be achieved at the same time. The digital data output from these digital formers 19 are once stored in a memory 24, and then, these digital data are read out from this memory 24 so as to be processed in a data processing unit 25. That is, waveforms of the digital detection data are detected, the detected digital data are converted into image data, and a predetermined image processing operation is carried out as to these digital detection data. Thereafter, the processed detection data are again stored in the memory 24.

Furthermore, since a scanning format conversion as to the digital detection data is carried out in a DSC (digital scan converter) 26, the image data of a scanning space of ultrasonic beams is converted into image data of a physical space. In the case where a three-dimensional image is displayed, a three-dimensional image constructing unit 27 may be interposed between the memory 24 and the DSC 26. The three-dimensional image constructing unit 27 produces voxel data from plural sets of tomographic data stored in the memory 24, while this voxel data corresponds to data as to a certain volume. The image data, the scanning format of which has been converted by the DSC 26, is converted into an analog signal by a D/A converter 28, and then, this analog signal is displayed on an image display unit 29.

Figure 2A:
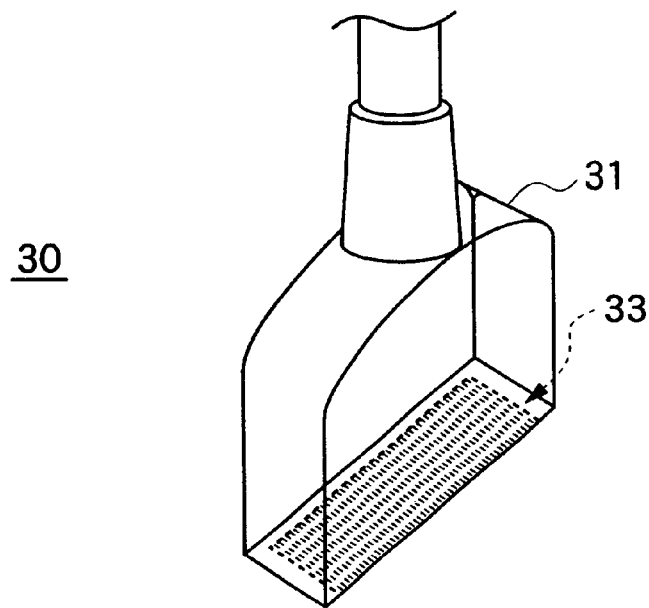
FIG. 2A is a transparent perspective view illustratively showing an example of a construction of an ultrasonic probe employed in the ultrasonic imaging apparatus as shown in FIG. 1.
Figure 2B:
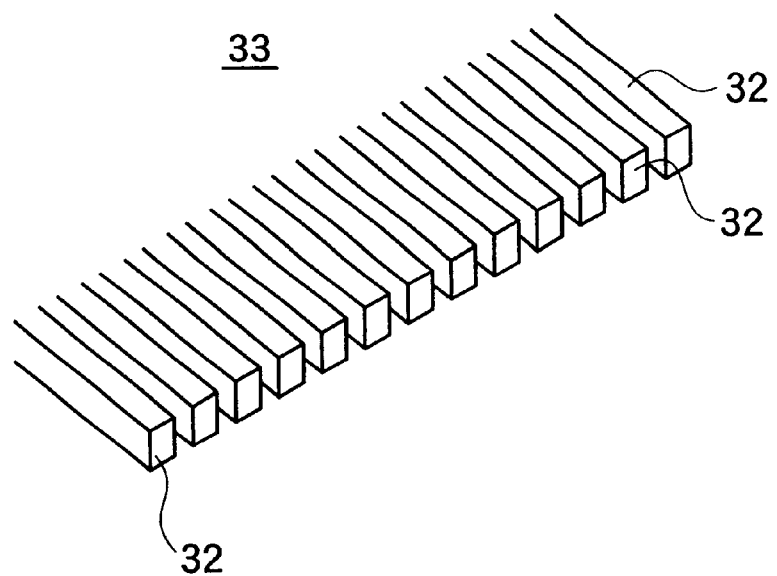
FIG. 2B is a perspective view showing a portion of a one-dimensional array in an enlarge manner, which is contained in the ultrasonic probe as shown in FIG. 2A.

FIG. 2A is a transparent perspective view showing one example of a construction of an ultrasonic probe 30 employed in the ultrasonic imaging apparatus according to this first embodiment, and FIG. 2B is a perspective view showing a portion of one-dimensional array in an enlarge manner, which is contained in the ultrasonic probe 30 as shown in FIG. 2A. As shown in FIGS. 2A and 2B, within a probe main body 31 of the ultrasonic probe 30, a plurality of arrayed vibration elements 32 which constitute the ultrasonic transducers are assembled in a comb-shaped array, and thus, may constitute a one-dimensional array 33. A plurality of these arrayed vibration elements 32 are vibrated in response to drive signals entered into these vibration elements 32 so as to transmit ultrasonic pulses toward an object to be inspected. Then, these arrayed vibration elements 32 receive ultrasonic echoes reflected from the object under inspection to be vibrated, so that detection signals (electric signals) are output therefrom. As these arrayed vibration elements, for example, a piezoelectric element containing the above-described PZT and PVDF is employed.

Next, a description will now be made of one example of a method of imaging an object to be inspected, while using the ultrasonic imaging apparatus according to the first embodiment.

Figure 3A:
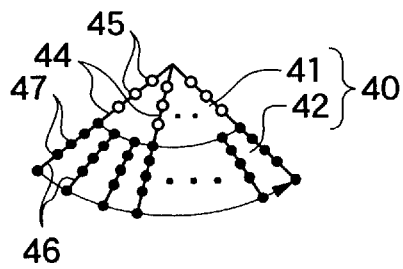
FIGS. 3A to 3C are explanatory diagrams for explaining one example of an imaging method with employment of the ultrasonic imaging apparatus as shown in FIG. 1.

As illustrated in FIG. 3A, in such a case where a fan-shaped two-dimensional area 40 contained in the object to be inspected is scanned, this two-dimensional area 40 is subdivided into two portions 41 and 42 having different depth degrees. Thereafter, a shallower portion 41 located on the shallower side of this fan-shaped two-dimensional area 40 is firstly scanned. Subsequently, a deeper portion 42 located on the deeper side of this fan-shaped two-dimensional area 40 is scanned. Alternatively, after the deeper portion 42 has been scanned, the shallower portion 41 may be scanned.

Figure 3B:
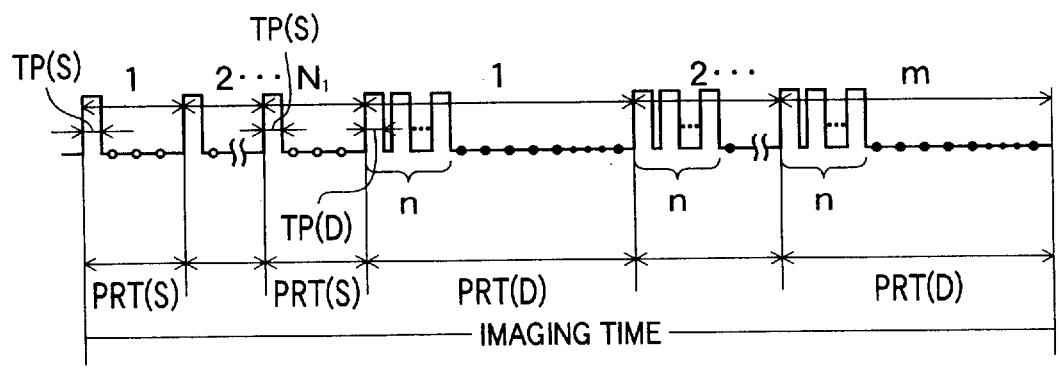
Figure 3C:
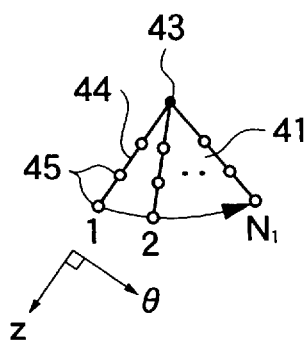

In the case where the shallower portion 41 located in the two-dimensional area 40 as shown in FIG. 3A is scanned, as represented in FIG. 3B, a plurality of ultrasonic pulses are transmitted from the ultrasonic probe 30 to this shallower portion 41 in a pulse transmission time slot TP(S) contained in one pulse repetition time period PRT(S). Since these plural ultrasonic pulses are synthesized with each other, as shown in FIG. 3C, an ultrasonic beam 44 is formed. This ultrasonic beam 44 is extended from a transmission point 43 in the shallower portion 41 in a depth direction (z-direction in FIG. 3C). Then, image information at a plurality of sampling points 45 is sequentially sampled, while these sampling points 45 are distributed along the ultrasonic beam 44 in, for example, an equi-interval. In other words, as shown in FIG. 3B, image information related to the respective sampling points is sampled every time a constant time period has passed. In FIG. 3B, a white-colored point represents such a time point when image information related to a sampling point contained in the shallower portion 41 is sampled.

As a result, as shown in FIG. 3C, such a scanning process operation is repeatedly carried out "$N_1$" times (symbol "$N_1$" is a natural number), for example, in an equi-angular interval with respect to an angle direction (namely, θ-direction) of the shallower portion 41 to scan an entire area of this shallower portion 41, so that image information related to all of the sampling points 45 involved in the shallower portion 41 is obtained. As explained above, according to this embodiment, since the firstly-imaged portion in the two-dimensional area is limited to the shallower portion 41, ultrasonic echoes reflected from this shallower portion 41 are recorded within a short time period. As a consequence, the resultant imaging time with respect to the shallower portion 41 can be shortened, as compared with that required in the conventional sector scanning operation (see FIG. 7).

When the shallower portion 41 is scanned, strengths of ultrasonic pulses for transmission may be decreased as compared with those of the ultrasonic pulses used in the conventional sector scanning operation. Also, it is preferable to optimize strengths of ultrasonic pulses for transmission when the shallower portion is scanned. If so, then insensible time may be shortened which occurs because high voltages of pulsers are applied to the ultrasonic signal reception system. Then, image information related to an area in the vicinity of a surface of an object to be inspected (for example, an area near a body surface) can be sampled. In addition, it is possible to suppress fogging which is caused by multi-path reflections of ultrasonic echoes reflected from the shallower portion, so that images having a better SN ratio can be reproduced as to the shallower portion. Also, it is preferable that density of ultrasonic beams in the shallower portion is made equal to, or lower than the density of the ultrasonic beams in the conventional sector scanning operation. If so, then imaging time required to image the shallower portion can be furthermore shortened.

Figure 4A:
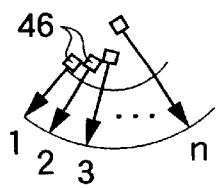
FIGS. 4A to 4C are explanatory diagrams for explaining another example of an imaging method with employment of the ultrasonic imaging apparatus as shown in FIG. 1.

On the other hand, in such a case where the deeper portion 42 within the two-dimensional area 40 as shown in FIG. 3A is scanned, as represented in FIG. 3B, a plurality of ultrasonic pulses are transmitted from the ultrasonic probe to this deeper portion 42 in each of "n" pieces of pulse transmission time slots TP(D) which are contained in one pulse repetition time period PRT (D). Note that symbol "n" indicates a natural number. A plurality of ultrasonic pulses which are transmitted from the ultrasonic probe within each of the pulse transmission time slots TP (D) are synthesized with each other to form a plurality of synthesized beams having different propagation directions from each other as shown in FIG. 4A. That is, the respective ultrasonic pulses are propagated through the object to be inspected with having time differences, a plurality of ultrasonic beams 46 are formed which are extended in different directions. It should also be noted that these ultrasonic beams are preferably formed under such a condition that these ultrasonic beams are spatially separated from each other. If so, then reception ultrasonic echoes which are reflected from the respective different directions can be readily separated from each other by way of the reception focusing operation.

Figure 8A:
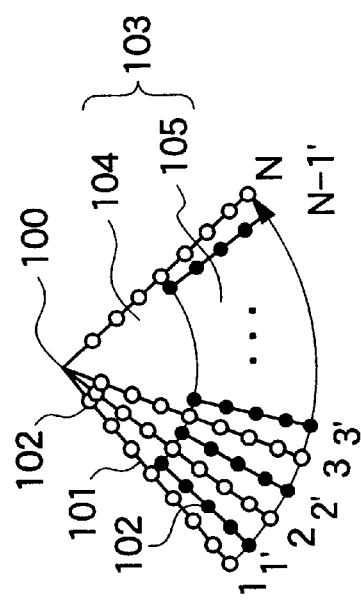
FIGS. 8A and 8B are explanatory diagrams for explaining another example of the conventional ultrasonic imaging method.
Figure 8B:
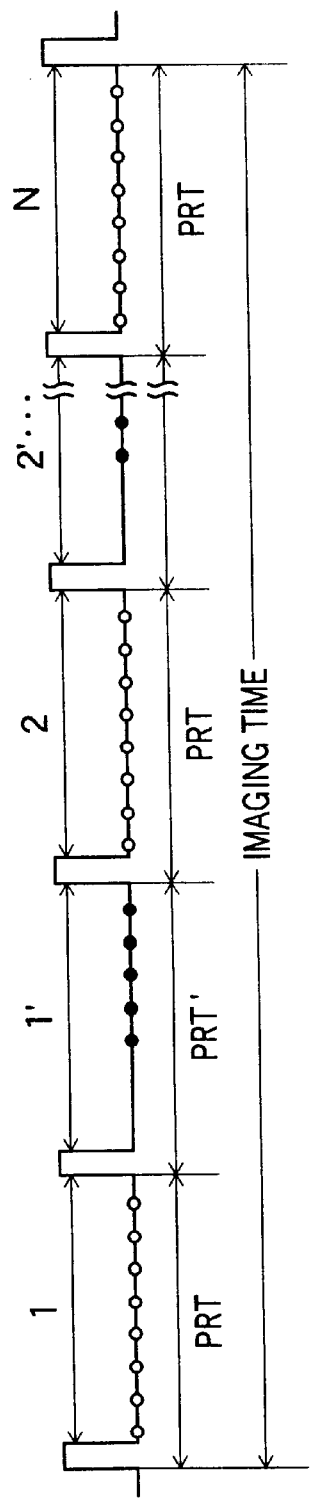

The transmission of the ultrasonic pulses with respect to the plural directions of the deeper portions 42 is carried out "n" times within a time duration which is required for the ultrasonic pulses to return to the ultrasonic probe after being reflected from the shallower portion 41. This time duration will be referred to as "shallower portion reciprocation time". Since the transmission timing of the ultrasonic pulses is set in accordance with the above-described manner, a single scanning time as to the deeper portion can be largely shortened as compared with that of the conventional sector scanning operation as shown in FIG. 8.

Then, image information is sampled at time instants indicated by black-colored time points (see FIG. 4C) as to a plurality of sampling points 47 which are distributed, for instance, in an equi-interval along "n" lines of ultrasonic beams formed within the deeper portion. At this time, positions of reception focal points are varied by employing detection signals of a plurality of ultrasonic transducers contained in the ultrasonic probe, phases of these detection signals are matched, and then, these detection signals are separated from each other. It should also be understood that most of these received ultrasonic echoes are formed by summing the ultrasonic pulses with each other reflected from a plurality of places within the deeper portion. However, properly-selected weights and also properly-selected time delays have been given to the respective detection signals, and then, the resultant detection signals are added to each other, so that only such a detection signal corresponding to a focal region formed within the deeper portion can be emphasized.

Figure 4B:
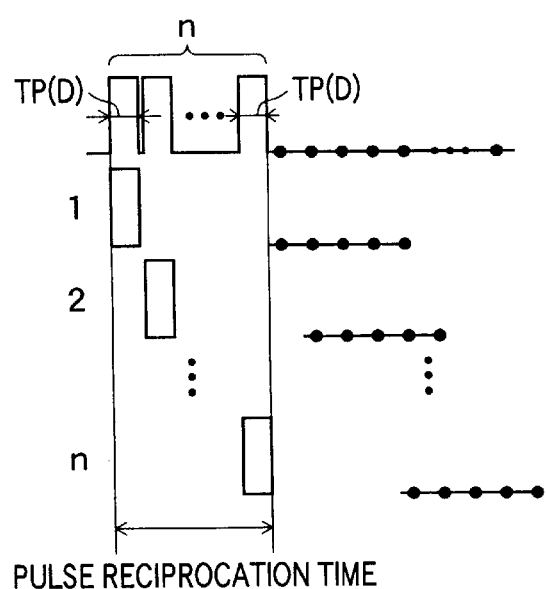
Figure 4C:
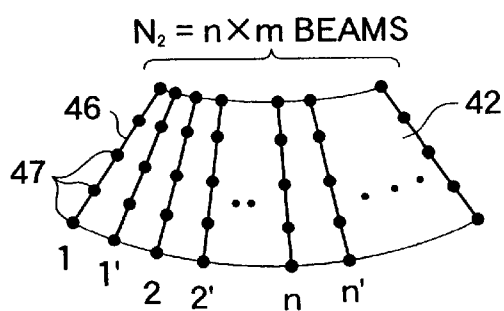

As shown in FIG. 4C, while the transmission direction is slightly shifted in the angle direction (namely, θ-direction) of the deeper portion, such a scanning process operation is repeatedly carried out "m" times, so that an entire portion of this deeper portion can be scanned. It should also be noted that symbol "m" indicates a natural number. Thus, a total number "$N_2$" of ultrasonic beams in the deeper portion becomes $N_2 = n \times m$. In this case, entire imaging time "$T_F$" related to the fan-shaped two-dimensional area according to this first embodiment is expressed by the following equation:

$$T_F = N_1 \times PRT(S) + m \times PRT(D)$$

Figure 7A:
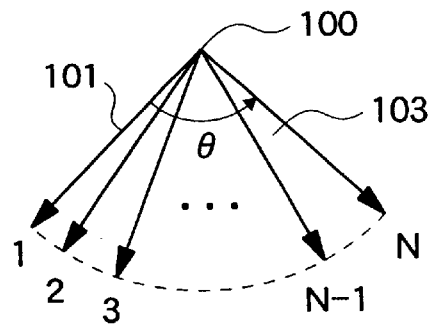
FIGS. 7A to 7C are explanatory diagrams for explaining an example of the conventional ultrasonic imaging method.
Figure 7B:
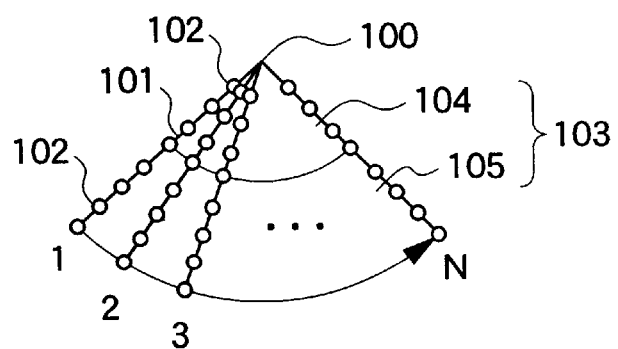
Figure 7C:
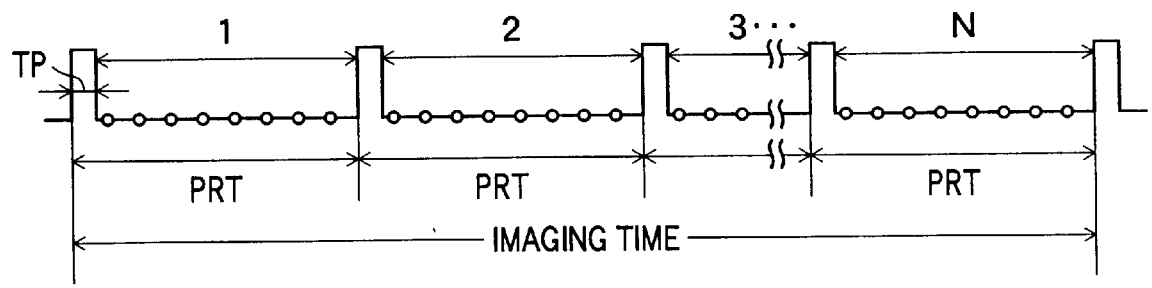

Assuming now that a total scanning time is expressed as "N" and a duration of repetition time is indicated as "PRT" in such a case where the same fan-shaped two-dimensional area is scanned by way of the conventional sector scanning operation as shown in FIG. 7, it is ideal that the above-explained imaging time "$T_F$" is set to satisfy the below-mentioned formula:

$$T_F < N \times PRT$$

However, in an actual case, the entire imaging time "$T_F$" may be set to satisfy the following formula:

$$T_F < 2(N \times PRT)$$

Next, an ultrasonic imaging apparatus according to a second embodiment of the present invention will now be described. The ultrasonic imaging apparatus according to this second embodiment is featured by that a three-dimensional image is obtained by employing an optical detection type two-dimensional sensor array to receive ultrasonic waves.

Figure 5:
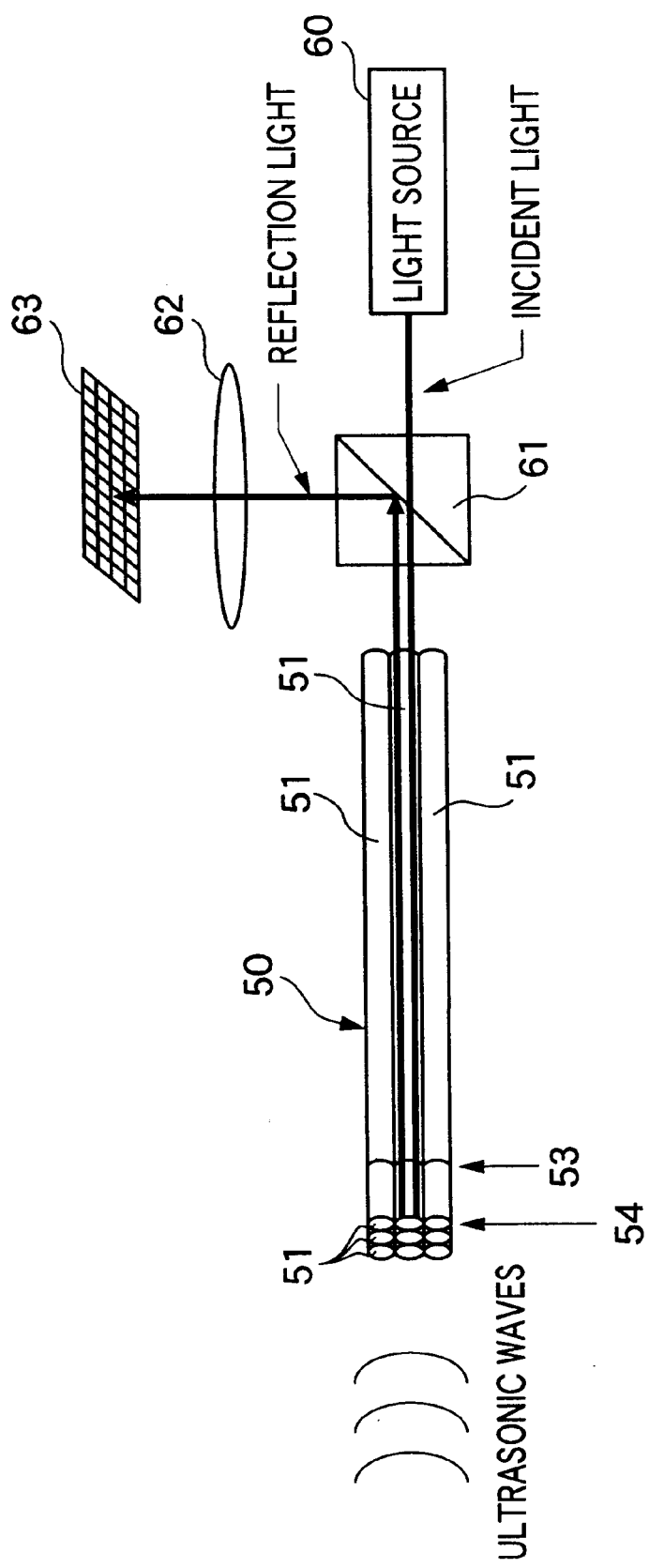
FIG. 5 is an illustration schematically showing a partial construction of an ultrasonic imaging apparatus according to a second embodiment of the present invention.

FIG. 5 illustratively shows a basic idea of an arrangement of the ultrasonic imaging apparatus according to this third embodiment. As illustratively shown in FIG. 5, a two-dimensional sensor array 50 is constituted in such a manner that sectional planes of very fine optical fibers 51 are arranged in a two-dimensional matrix shape. In this case, ultrasonic detecting elements are constructed by either a Fabry-Perot resonator (abbreviated as an "FPR" hereinafter) or a fiber Bragg grating, which are formed on tip portions of a plurality of optical fibers.

Light produced from a light source 60 passes through a beam splitter 61 and then is entered into the optical fiber array. The light which is entered into the respective optical fibers 51 is reflected by both a half mirror 53 and a total reflection mirror 54, which are formed on both edges of the FPR. Since a total reflection plane of this total reflection mirror 54 is influenced by geometrical displacement which is caused by ultrasonic waves applied to the ultrasonic detecting elements, the reflection light is modulated by this geometrical displacement, and the modulated reflection light is again entered into the beam splitter 61. The reflection light entered into the beam splitter 61 is directly focused onto a photodetector 63, or is focused via an optical fiber and the like onto the photodetector 63. Alternatively, this reflection light is focused via an image focusing system 62 such as a lens onto this photodetector 63. It should be noted that in this second embodiment, ultrasonic transmission elements are independently provided with respect to the above-explained ultrasonic detection elements.

Figure 6:
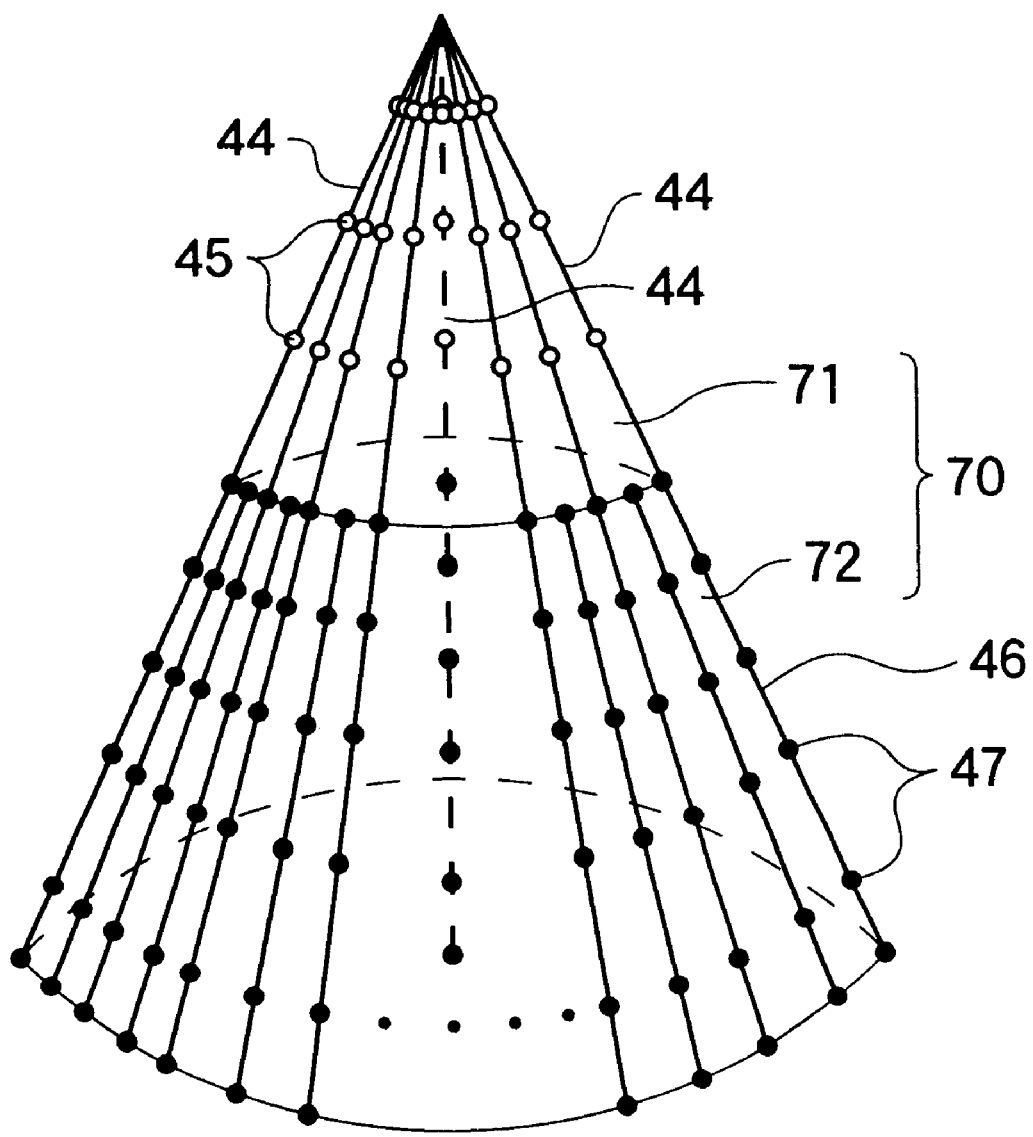
FIG. 6 is a diagram illustratively showing a scanning area within an object to be inspected and an example of a division pattern of the scanning area which is scanned by employing the ultrasonic probe as shown in FIG. 5.

FIG. 6 is an illustration showing an example of a scanning area and divisions thereof within an object to be inspected, which is scanned by employing the ultrasonic imaging apparatus as shown in FIG. 5. As shown in FIG. 6, in the case where a circular-cone-shaped three-dimensional area 70 contained in the object to be inspected is scanned, this three-dimensional area 70 is divided into a plurality of divisions having different depth degrees, and thereafter, a shallower portion 71 located on the shallower side of the area 70 is firstly scanned, and subsequently, a depth deeper portion 72 on the deeper side of this area 70 is scanned. In this case, the three-dimensional area 70 is scanned in such a manner that density of ultrasonic beams used to scan the deeper portion 72 becomes higher than that of the shallower portion 71. Alternatively, after the deeper portion 72 has been scanned, the shallower portion 71 may be scanned.

In the case where the shallower portion 71 within the three-dimensional area 70 is scanned, a plurality of ultrasonic pulse are transmitted to the shallower portion 71 so as to form an ultrasonic beam 44 within such a pulse transmission time slot contained in a single repetition time duration. Next, image information is sequentially sampled at a plurality of sampling points 45 along the ultrasonic beam 44, and these sampling points 45 are distributed, for example, in an equi-interval. While such an ultrasonic scanning process operation is repeatedly carried out plural times with respect to the shallower portion 71, an entire portion of the shallower portion 71 is scanned, so that image information related to all of these sampling points 45 contained in the shallower portion 71 can be obtained. In order to realize an ultrasonic imaging method involving such an ultrasonic scanning process operation, for example, the ultrasonic transmission elements may transmit the ultrasonic pulses to the object to be inspected in accordance with the time chart as shown in FIG. 3B.

On the other hand, in such a case where the deeper portion 72 contained in the three-dimensional area 70 is scanned, a plurality of ultrasonic pulses are transmitted to the deeper portion 72 and thus, a plurality of ultrasonic beams 46 extended in different directions are sequentially formed within each of a plurality of pulse transmission time slots which are involved in a single repetition time duration. Next, image information is sequentially sampled at a plurality of sampling points 47 along the ultrasonic beams 46, and these sampling points 46 are distributed, for instance, in an equi-interval in the deeper portion 72. While such an ultrasonic scanning process operation is repeatedly carried out with respect to the deeper portion 72 by slightly shifting the transmission direction, an entire portion of the deeper portion 72 is scanned, so that image information related to all of these sampling points 47 contained in the deeper portion 72 can be obtained. In order to realize an ultrasonic imaging method involving such an ultrasonic scanning process operation, the ultrasonic transmission elements may transmit the ultrasonic pulses to the object to be inspected in accordance with, for example, the time charts as shown in FIGS. 3B and 4B.

According to the present invention, either the fan-shaped two-dimensional area or the circular-cone-shaped three-dimensional area contained in the object to be inspected is divided into at least the shallower portion and the deeper portion, and these portions are independently scanned one by one. In particular, as to this deeper portion, a plurality of ultrasonic waves are transmitted to the object to be inspected so as to sequentially form a plurality of ultrasonic beams extended in the different directions within a time period in which the ultrasonic echoes reflected from the shallower portion are obtained. As a consequence, the ultrasonic beam density of the deeper portion can be made higher than that of the shallower portion, while the scanning time is not much increased. As a result, the density of the sampling points can be increased in response to the depths of the object to be inspected, while the frame rate is not unnecessarily decreased. As a result, the ultrasonic resolution of the depth degree within the object can be improved up to at least approximately the ultrasonic resolution of the shallower portion, so that the ultrasonic images as to the object can be obtained in high precision.

As apparent from the foregoing descriptions, the present invention is not limited to the above-described embodiments. For example, while either the fan-shaped two-dimensional area or the circular-cone-shaped three-dimensional area contained in the object under inspection may be divided into three, or more portions having different depth degrees, a total scanning number of times may be increased in response to depths of the respective portions. In this alternative case, the ultrasonic beam scanning operations may be sequentially carried out from the shallowest portion to the deepest portion, or from the deepest portion to the shallowest portion. Alternatively, one of these portions is sequentially selected at random, and the selected portion may be scanned. If the object to be inspected is scanned in accordance with the above-described alternative scanning manner, ultrasonic images of the object would be reproduced in higher precision.

As previously described in detail, according to the present invention, the density of the sampling points can be increased in accordance with the depths within the object to be inspected, while the frame rate is not unnecessarily decreased.

What is claimed is:

1. An ultrasonic imaging method of obtaining image information in such a manner that a predetermined area contained in an object to be inspected is divided into at least a first area located most shallowly and a second area located deeper than the first area so as to scan the first and second areas by employing ultrasonic waves, said ultrasonic imaging method comprising the steps of:

(a) transmitting and receiving ultrasonic waves focused in one focus direction within the first area by using a plurality of ultrasonic transducers included in an ultrasonic probe to take samples of an ultrasonic image at a plurality of points in the focus direction, and changing the focus direction to scan the first area;

(b) sequentially transmitting ultrasonic waves focused in respective focus directions within the second area by using said plurality of ultrasonic transducers in a predetermined time period, thereafter receiving ultrasonic waves reflected from the respective focus directions by using said plurality of ultrasonic transducers to take samples of the ultrasonic image at a plurality of points in the respective focus directions;

(c) obtaining image information as to the plural points within the first area on the basis of detection signals obtained from said plurality of ultrasonic transducers at step (a); and (d) obtaining image information as to the plural points within the second area on the basis of detection signals obtained from said plurality of ultrasonic transducers at step (b).

2. An ultrasonic imaging method according to claim 1, wherein step (b) includes sequentially transmitting ultrasonic waves focused in respective focus directions within a time period in which ultrasonic waves reflected from an area shallower than the second area reach said plurality of ultrasonic transducers.

3. An ultrasonic imaging method according to claim 1, wherein step (b) is repeatedly carried out while the focus directions are changed.

4. An ultrasonic imaging method according to claim 2, wherein step (b) is repeatedly carried out while the focus directions are changed.

5. An ultrasonic imaging method according to claim 3, wherein a total number of the focus directions to be scanned within the second area is larger than the focus directions to be scanned within the first area.

6. An ultrasonic imaging method according to claim 4, wherein a total number of the focus directions to be scanned within the second area is larger than the focus directions to be scanned within the first area.

7. An ultrasonic imaging method according to claim 1, wherein step (d) includes obtaining image information as to the plural points in each of the focus directions by applying a weight and a time delay corresponding to the focus direction to the detection signals obtained from said plurality of ultrasonic transducers, and thereafter, summing the resultant detection signals to each other.

8. An ultrasonic imaging method according to claim 2, wherein step (d) includes obtaining image information as to the plural points in each of the focus directions by applying a weight and a time delay corresponding to the focus direction to the detection signals obtained from said plurality of ultrasonic transducers, and thereafter, summing the resultant detection signals to each other.

9. An ultrasonic imaging method according to claim 3, wherein step (d) includes obtaining image information as to the plural points in each of the focus directions by applying a weight and a time delay corresponding to the focus direction to the detection signals obtained from said plurality of ultrasonic transducers, and thereafter, summing the resultant detection signals to each other.

10. An ultrasonic imaging method according to claim 4, wherein step (d) includes obtaining image information as to the plural points in each of the focus directions by applying a weight and a time delay corresponding to the focus direction to the detection signals obtained from said plurality of ultrasonic transducers, and thereafter, summing the resultant detection signals to each other.

11. An ultrasonic imaging apparatus for obtaining image information in such a manner that a predetermined area contained in an object to be inspected is divided into at least a first area located most shallowly and a second area located deeper than the first area so as to scan the first and second areas by employing ultrasonic waves, said ultrasonic imaging apparatus comprising:

drive signal generating means for delaying input signals to supply drive signals having specific phases, respectively;

an ultrasonic probe having a plurality of ultrasonic transducers, for transmitting ultrasonic waves in accordance with the drive signals and for receiving ultrasonic waves to output detection signals based upon the received ultrasonic waves;

signal processing means for processing the detection signals to obtain image information of an object to be inspected on the basis of the processed detection signals; and control means for controlling said drive signal generating means and said signal processing means to (a) transmit and receive ultrasonic waves focused in one focus direction within the first area by using said plurality of ultrasonic transducers to take samples of an ultrasonic image at a plurality of points in the focus direction, and change the focus direction to scan the first area and (b) sequentially transmit ultrasonic waves focused in respective focus directions within the second area by using said plurality of ultrasonic transducers in a predetermined time period, thereafter receive ultrasonic waves reflected from the respective focus directions by using said plurality of ultrasonic transducers to take samples of the ultrasonic image at a plurality of points in the respective focus directions.

12. An ultrasonic imaging apparatus according to claim 11, wherein said control means controls said drive signal generating means to sequentially transmit ultrasonic waves focused in respective focus directions within a time period in which ultrasonic waves reflected from an area shallower than the second area reach said plurality of ultrasonic transducers.

13. An ultrasonic imaging apparatus according to claim 11, wherein said control means controls said drive signal generating means and said signal processing means in such a manner that transmission and reception of ultrasonic waves are repeatedly carried out with respect to the second area while the focus directions are changed.

14. An ultrasonic imaging apparatus according to claim 13, wherein a total number of the focus directions to be scanned within the second area is larger than the focus directions to be scanned within the first area.

15. An ultrasonic imaging apparatus according to claim 11, wherein said signal processing means includes a plurality of sets each comprising:

a plurality of delay means for applying delay time to the detection signals; and adding means for adding output signals derived from said plurality of delay means to each other.

16. An ultrasonic imaging apparatus according to claim 11, wherein said drive signal generating means includes a plurality of pulse generating circuits.

17. An ultrasonic imaging apparatus according to claim 11, wherein said plurality of ultrasonic transducers are assembled into said ultrasonic probe to form any one of a one-dimensional array and a two-dimensional array.

18. An ultrasonic imaging apparatus according to claim 11, wherein said plurality of ultrasonic transducers include:

a plurality of piezoelectric elements for converting input electric signals into ultrasonic waves to transmit the ultrasonic waves, and also converting received ultrasonic waves into electric echo signals to output the ultrasonic echo signals.

19. An ultrasonic imaging apparatus according to claim 11, wherein said plurality of ultrasonic transducers include:

a plurality of piezoelectric elements for converting input electric signals into ultrasonic pulses to transmit the ultrasonic pulses; and a plurality of photodetecting elements for converting received ultrasonic pulses into optical signals to output the optical signals.

20. An ultrasonic imaging apparatus according to claim 17, wherein said plurality of ultrasonic transducers include:

a plurality of piezoelectric elements for converting input electric signals into ultrasonic pulses to transmit the ultrasonic pulses; and a plurality of photodetecting elements for converting received ultrasonic pulses into optical signals to output the optical signals.

* * * * *